US006459773B1

(12) United States Patent
Posthuma

(10) Patent No.: US 6,459,773 B1
(45) Date of Patent: Oct. 1, 2002

(54) SYSTEM TO PRE-QUALIFY COPPER SUBSCRIBER LOOPS FOR HIGH BANDWIDTH ACCESS SERVICE USING SUBSCRIBER OR NETWORK GENERATED TONES

(75) Inventor: Carl R. Posthuma, Wheaton, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/565,145

(22) Filed: May 5, 2000

(51) Int. Cl.⁷ .......................... H04M 1/24; H04M 3/08; H04M 3/22; H04J 1/16; H04L 1/00
(52) U.S. Cl. ................ 379/1.04; 379/22.02; 379/27.03; 370/248
(58) Field of Search ........................... 379/1, 9, 10, 15, 379/27, 29, 32, 34; 370/241.2, 248, 484, 487, 522

(56) References Cited

U.S. PATENT DOCUMENTS

| | | | | |
|---|---|---|---|---|
| 5,128,619 A | * | 7/1992 | Bjork et al. ................ | 324/533 |
| 6,091,713 A | * | 7/2000 | Lechleider et al. ......... | 370/248 |
| 6,215,855 B1 | * | 4/2001 | Schneider .................... | 379/22 |
| 6,266,395 B1 | * | 7/2001 | Liu et al. ..................... | 379/27 |
| 6,292,468 B1 | * | 9/2001 | Sanderson ................... | 370/241 |

OTHER PUBLICATIONS

Bellcore–Sapphyre Loop Qualification Service, Charles Woloszynski, Summer 1998, pp. 2–7.*
xDSL Loop Qualification and Testing, IEEE Communications Magazine, May 1999, pp. 79–83.*

* cited by examiner

Primary Examiner—Binh Tieu
(74) Attorney, Agent, or Firm—Patton Boggs, LLP

(57) ABSTRACT

The system to pre-qualify copper subscriber loops for high bandwidth access service determines electrical characteristics of a subscriber line served by a central office switch from a location remote from said subscriber line absent a direct metallic connection exclusively to said subscriber line. This is accomplished where the subscriber line has subscriber equipment connected thereto at an end distant from said central office switch by establishing a communication connection through the central office switch between the service provider and the subscriber equipment connected to said subscriber line. In response to the establishment of this communication connection, electrical signals, comprising subscriber or network generated tone signals, are applied to the subscriber line to enable the service provider to determine the electrical characteristics of the subscriber line by analyzing the received tone signals.

18 Claims, 2 Drawing Sheets

SYSTEM TO PRE-QUALIFY COPPER SUBSCRIBER LOOPS FOR HIGH BANDWIDTH ACCESS SERVICE USING SUBSCRIBER OR NETWORK GENERATED TONES

CROSS-REFERENCE TO RELATED APPLICATIONS

This application is related to a U.S. Patent Application titled "System to Pre-Qualify Copper Subscriber Loops for High Bandwidth Access Service Using Subscriber Voice Signals" and filed on the same day as the present application.

FIELD OF THE INVENTION

This invention relates to systems to qualify subscriber lines for high bandwidth access service and, in particular, to a system that provides a service provider with the ability to pre-qualify subscriber lines for high bandwidth access service where the service provider does not have direct metallic access to the subscriber line.

PROBLEM

It is a problem in the field of high bandwidth access service for the service provider to determine the transmission characteristics of a subscriber line in an efficient and cost effective manner. The transmission characteristics of subscriber lines vary significantly due to a number of factors, including but not limited to: the length of the loop which comprises the subscriber line, the number and integrity of splices and connections made in the physical plant of the subscriber line, environmental soundness of the cable containing the conductors that are used to implement the subscriber line, the presence of load coils, and the like. Given the wide disparity in transmission characteristics of subscriber lines, it typically necessitates a craftsperson visit to the subscriber premises to execute tests on the subscriber line to ascertain the viability of this line for use in high bandwidth access service. The craftsperson runs transmission tests on the subscriber line by establishing a communication connection from the subscriber premises to a centrally located test facility. Various signals are then applied to this communication connection at the subscriber premises and compared with the signals received at the centrally located test facility. The resultant measured differences are indicative of the ability of the service provider to use this subscriber line for high bandwidth access service.

In contrast, service providers who manage the serving central office switch obtain a direct metallic connection to the selected subscriber line, exclusive of additional spans of communication circuitry, have the ability to directly measure the transmission characteristics of the selected subscriber line. The service provider can then collect data directly from the subscriber line which indicates the electrical characteristics of the subscriber line. This enables the service provider to pre-qualify subscriber loops for high bandwidth access service, without having to dispatch a craftsperson to the subscriber premises to execute tests on the subscriber line.

This disparity in access to the subscriber line facilities is reflected in a significantly higher cost to the service provider who does not have a direct metallic connection to the selected subscriber line, exclusive of additional spans of communication circuitry. This economic penalty represents a significant problem to these service providers in determining candidate subscribers for high bandwidth access service.

SOLUTION

The above-described problems are solved and a technical advance achieved in the field by the system to pre-qualify copper subscriber loops for high bandwidth access service which determines electrical characteristics of a subscriber line served by a central office switch from a location remote from said subscriber line absent a direct metallic connection exclusively to said subscriber line. This is accomplished, where the subscriber line has subscriber equipment connected thereto at an end distant from said central office switch, by establishing a communication connection through the central office switch between the service provider and the subscriber equipment connected to said subscriber line. In response to the establishment of this communication connection, electrical signals, comprising subscriber or network generated signals, are applied to the subscriber line to enable the service provider to determine the electrical characteristics of the subscriber line by analyzing the received electrical signals. These generated signals can be Touch Tone signals generated by the subscriber telephone station set, dial pulses from a rotary dial subscriber telephone station set, tone signals generated by an auxiliary device connected to the subscriber line, computer generated modem tones, or tone signals reflected off the hybrid in the central office line card and/or subscriber telephone station set, which tone signals consist of tones generated by the service provider or call progress tones.

The involvement of the subscriber in the pre-qualification process significantly reduces the cost to service providers in determining candidate subscribers for high bandwidth access service. The subscriber generated signals can have a random or predetermined content. In particular, the subscriber may be asked to transmit a sequence of Touch Tone signals generated by the subscriber telephone station set, or a sequence of dial pulses from a rotary dial subscriber telephone station set, or tone signals generated by an auxiliary device connected to the subscriber line, or computer generated modem in order to obtain an output of sufficient duration and content to enable the system to pre-qualify copper subscriber loops for high bandwidth access service to execute subscriber line analysis routines. Alternatively, a subscriber line can be tested without the subscriber being involved in the test by the use of tone signals reflected off the hybrid in the central office line card and/or subscriber telephone station set, which tone signals consist of tones generated by the service provider or call progress tones.

While the addition of the spans of the communication connection through the serving central office and a customer loop to the service provider adds electrical characteristics to the end-to-end connection with the selected subscriber line, these additional characteristics can be factored in the final determination of the electrical characteristics of the subscriber line, since they are relatively constant over all communication connections to subscriber lines. Over time, a fairly accurate representation of these additional characteristics can be obtained and used to compensate for the presence of the additional spans in the communication connection. As a result, a relatively representative reading of the electrical characteristics of the subscriber line can be gained without the need to dispatch a craftsperson to the subscriber premises.

DETAILED DESCRIPTION

Figure 1:
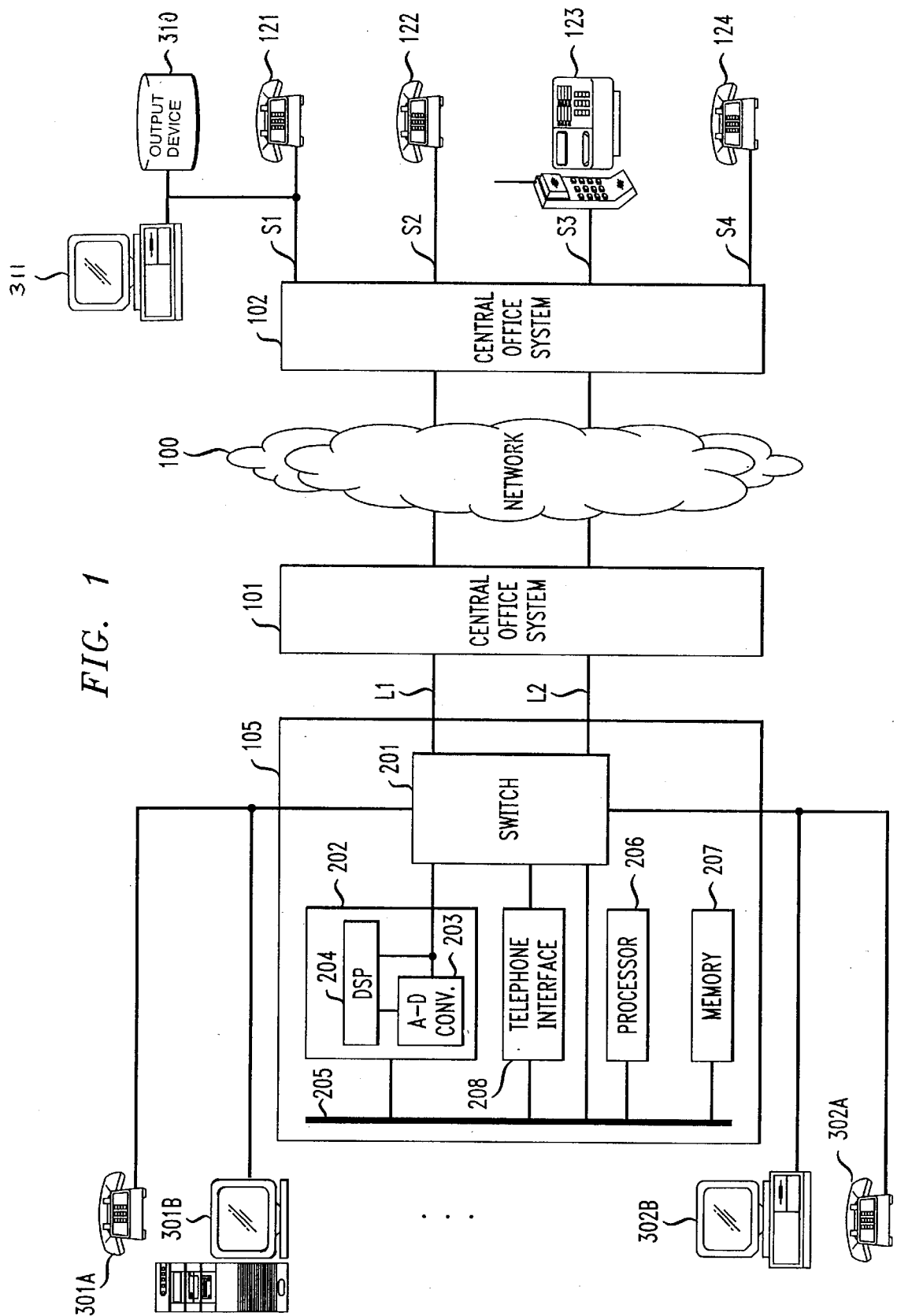
FIG. 1 illustrates in block diagram form the system to pre-qualify copper subscriber loops for high bandwidth access service and an operating environment in which such system is typically located.

FIG. 1 illustrates in block diagram form the system to pre-qualify copper subscriber loops for high bandwidth access service 105 and an operating environment in which such system is typically located. In particular, a switching system, such as the central office switch 102, serves a plurality of local loops S1-Sn, termed "subscriber lines" herein. The subscriber lines S1-Sn are typically terminated with some form of subscriber equipment, such as telephone station set 121–124, modem equipped personal computer 311, telemetry equipment or combinations of such equipment. In the present example, subscriber line S1 is terminated with a telephone station set 121. The central office switch 102 is part of the Public Switched Telephone Network (PSTN) 100 which serves to interconnect central office switch 102 with central office switch 101 and other like apparatus, typically by transmission facilities, such as T1 digital trunks. The system to pre-qualify copper subscriber loops for high bandwidth access service 105 is shown as connected to central office switch 101, although it could also be connected to central office switch 102. The present example is for the purpose of illustration and is not intended to limit the scope of the invention disclosed herein.

The system to pre-qualify copper subscriber loops for high bandwidth access service 105 comprises a collection of apparatus which functions to interconnect a customer service representative as well as measurement equipment to a selected subscriber line. For example, the system to pre-qualify copper subscriber loops for high bandwidth access service 105 includes a switching element 201 which serves in well known fashion to interconnect the plurality of customer service representative telephone station sets 301–302 and the subscriber line measurement apparatus 202 to a selected one of trunks L1, L2 (such as T1 digital trunks) which interconnect the system to pre-qualify copper subscriber loops for high bandwidth access service 105 with the central office switch 101. Also included in the system to pre-qualify copper subscriber loops for high bandwidth access service 105 are a processor 206, memory 207 to operate the system to pre-qualify copper subscriber loops for high bandwidth access service 105 as well as to store data regarding the test results of measurements conducted on selected subscriber lines.

Subscriber Line Characteristics Measured Via a Switched Connection

Figure 2:
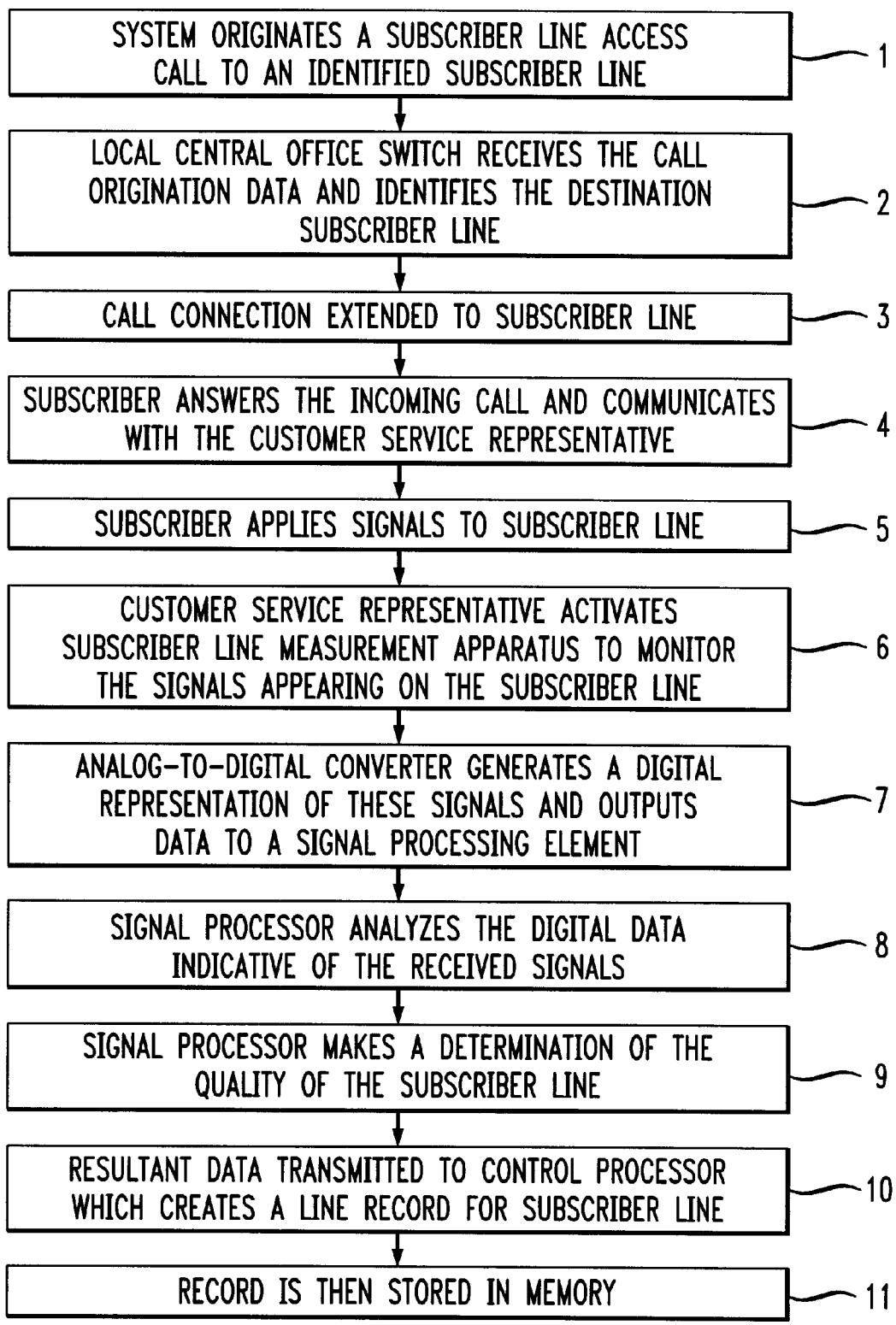
FIG. 2 illustrates in flow diagram form the operational steps taken by the system to pre-qualify copper subscriber loops for high bandwidth access service to perform a typical subscriber line access operation.

FIG. 2 illustrates in flow diagram form the operational steps taken by the present system to pre-qualify copper subscriber loops for high bandwidth access service 105 to perform a typical subscriber line access operation and line measurement operation, using the architecture that is disclosed in FIG. 1. The process begins at step 1 where the system to pre-qualify copper subscriber loops for high bandwidth access service 105 originates a subscriber line access call to an identified subscriber line S1 served via central office switches 101, 102 and PSTN 100 (or the subscriber initiates a call to the system to pre-qualify copper subscriber loops for high bandwidth access service 105). The call origination can entail the automatic dialing of the telephone number associated with subscribe line S1 by the automatic dialer 208, or comparable equipment located in the personal computer 301B associated with one of the customer service representatives, or can be manually dialed by the customer service representative using an associated telephone station set 301 A. In any case, the local central office switch 101 receives the call origination data at step 2 from the system to pre-qualify copper subscriber loops for high bandwidth access service 105 and identifies the destination subscriber line S1 and the central office switch 102 which serves subscriber line S1. As is well known, this call connection is extended at step 3 to subscriber line S1 and typically telephone station set 121 is rung. At step 4, the subscriber answers the incoming call at telephone station set 121 and communicates with the customer service representative located at personal computer 301B and associated telephone station set 301 A. In order for the customer service representative located at personal computer 301B to determine the transmission characteristics of subscriber line S1, subscriber generated signals must be applied to subscriber line S1 at the subscriber premises. These subscriber generated signals can be any of a number of readily available signals. The subscriber generated signals of can have a random or predetermined content. In particular, the subscriber may be asked to transmit a sequence of Touch Tone signals generated by the subscriber telephone station set, or a sequence of dial pulses from a rotary dial subscriber telephone station set, or tone signals generated by an auxiliary device connected to the subscriber line, or computer generated modem tones in order to obtain an output of sufficient duration and content to enable the system to pre-qualify copper subscriber loops for high bandwidth access service to execute subscriber line analysis routines. (Alternatively, a subscriber line can be tested without the subscriber being involved in the test by the use of tone signals reflected off the hybrid in the central office switch 102 and/or subscriber telephone station set, which tone signals consist of tones generated by the service provider or call progress tones.) The subscriber can even attach an audio output device 310 to subscriber line S1 to output a predetermined sequence of prerecorded tone signals on to subscriber line S1. Thus, at step 5 the subscriber uses telephone station set 121 to apply subscriber voice signals to the subscriber line S1. The customer service representative at step 6 activates subscriber line measurement apparatus 202 to monitor the signals appearing on the customer line L1, representative of the subscriber generated signals, as transmitted from the subscriber premises, over subscriber line S1 and through central office switches 101, 102, PSTN 100, customer line L1 and switch 201. At step 7, in response to receipt of these signals, the analog-to-digital converter 203 generates a digital representation of these signals, and outputs data to a processing element, such as digital signal processor 204. Digital signal processor 204 at step 8 analyzes the digital data indicative of the received signals and compares these representations with data indicative of expected signals received from subscriber line S1.

The processing of the received signals can be in analog form, or in digital form as noted above. The processing can include various well known signal processing algorithms to determine various transmission characteristics of subscriber line S1. These transmission characteristics include, but are not limited to: loop length, loop capacitance, the presence of load coils, frequency response characteristics of the loop. In any case, the digital signal processor 204 makes a determination at step 9 of the quality of the subscriber line S1 in terms of being able to support high bandwidth access service. The resultant data is transmitted at step 10 over bus 205 to processor 206, which creates a line record for subscriber line S1 which contains data such as, but not limited to: identity of the subscriber line, date of test, test mode, measured transmission characteristics, identity of customer line used to originate the communication connection. This record is then stored at step 11 in memory 207. The determination that is made is a function of the granularity that can reliably be obtained from the selected test signal source and measurements. The results can be as simple as "good", "indeterminate", or "poor". Alternatively, a numeric measure of quality can be determined and assigned to the subscriber line.

Alternative Implementations

While a single implementation has been described, it is evident that numerous variations are possible and within the intended scope of this description. The processor 206 may be used to supplement or even replace digital signal processor 204 in the processing of the digital data generated by analog-to-digital converter 203. The subscriber may not be the individual who receives the call from the customer service representative, but instead may originate the contact as part of an inquiry into the availability of high bandwidth access service. Alternatively, a utility worker who regularly visits the customer premises can initiate the above noted pre-qualification process by accessing subscriber line S1, initiating a contact with a customer service representative and providing tone signals to execute the above-noted test procedure.

Summary

The system to pre-qualify copper subscriber loops for high bandwidth access service determines electrical characteristics of a subscriber line served by a central office switch from a location remote from said subscriber line absent a direct metallic connection exclusively to said subscriber line. This is accomplished by having the subscriber apply subscriber generated signals to the subscriber line at the customer premises to enable the service provider to determine the electrical characteristics of the subscriber line.

What is claimed:

1. A system for determining electrical characteristics of a subscriber line served by a central office switch from a location remote from said subscriber line absent a direct metallic connection exclusively to said subscriber line, wherein said subscriber line has subscriber equipment connected thereto at an end distant from said central office switch, comprising:

means for establishing a communication connection from said system for determining electrical characteristics of a subscriber line to said subscriber equipment connected to said subscriber line;

means, responsive to a subscriber located at said subscriber line applying tone signals to said communication connection, for receiving electrical signals comprising said tone signals transmitted on said communication connection to said system for determining electrical characteristics of a subscriber line; and means for determining electrical characteristics of said subscriber line via said communication connection and in response to receipt of said electrical signals comprising tone signals applied to said communication connection by said subscriber.

2. The system for determining electrical characteristics of a subscriber line of claim 1 wherein said means for determining comprises:

means for comparing a representation of said tone signals with said received electrical signals.

3. The system for determining electrical characteristics of a subscriber line of claim 2 wherein said means for determining further comprises:

means, responsive to said means for comparing, for storing data in a memory indicative of a measure of a degree of correspondence between said representation of said tone signals with said received electrical signals.

4. The system for determining electrical characteristics of a subscriber line of claim 2 wherein said means for determining further comprises:

means, responsive to said means for comparing, for storing data in a memory indicative of at least one of a plurality of transmission characteristics of said subscriber line, including: loop length, loop capacitance, the presence of load coils, frequency response characteristics of the loop.

5. The system for determining electrical characteristics of a subscriber line of claim 1 wherein said means for determining further comprises:

means for sequencing through a predetermined test sequence of said tone signals.

6. The system for determining electrical characteristics of a subscriber line of claim 1 wherein said means for establishing a communication connection comprises:

means for initiating a communication connection to an identified subscriber line.

7. The system for determining electrical characteristics of a subscriber line of claim 1 wherein said means for establishing a communication connection comprises:

means, responsive to a subscriber at said subscriber line initiating a communication connection from said subscriber line to said system for determining electrical characteristics of a subscriber line, for interconnecting said communication connection with subscriber line measurement apparatus.

8. A method of operating a system for determining electrical characteristics of a subscriber line served by a central office switch from a location remote from said subscriber line absent a direct metallic connection exclusively to said subscriber line, wherein said subscriber line has subscriber equipment connected thereto at an end distant from said central office switch, comprising the steps of:

establishing a communication connection from said system for determining electrical characteristics of a subscriber line to said subscriber equipment connected to said subscriber line;

receiving, in response to a subscriber located at said subscriber line applying tone signals to said communication connection, electrical signals comprising said tone signals transmitted on said communication connection to said system for determining electrical characteristics of a subscriber line; and determining electrical characteristics of said subscriber line via said communication connection and in response to receipt of said electrical signals comprising tone signals applied to said communication connection by said subscriber.

9. The method of operating a system for determining electrical characteristics of a subscriber line of claim 8 wherein said step of determining comprises:

comparing a representation of said tone signals with said received electrical signals.

10. The method of operating a system for determining electrical characteristics of a subscriber line of claim 9 wherein said step of determining further comprises:

storing, in response to said step of comparing, data in a memory indicative of a measure of a degree of correspondence between said representation of said tone signals with said received electrical signals.

11. The method of operating a system for determining electrical characteristics of a subscriber line of claim 9 wherein said step of determining further comprises:

storing, in response to said step of comparing, data in a memory indicative of at least one of a plurality of transmission characteristics of said subscriber line, including: loop length, loop capacitance, the presence of load coils, frequency response characteristics of the loop.

12. The method of operating a system for determining electrical characteristics of a subscriber line of claim 8 wherein said step of determining further comprises:

sequencing through a predetermined test sequence of said tone signals.

13. The method of operating a system for determining electrical characteristics of a subscriber line of claim 8 wherein said step of establishing a communication connection comprises:

initiating a communication connection to an identified subscriber line.

14. The method of operating a system for determining electrical characteristics of a subscriber line of claim 8 wherein said step of establishing a communication connection comprises:

interconnecting, in response to a subscriber at said subscriber line initiating a communication connection from an identified subscriber line to said system for determining electrical characteristics of a subscriber line, said communication connection with subscriber line measurement apparatus.

15. A system for determining electrical characteristics of a subscriber line served by a central office switch from a location remote from said subscriber line absent a direct metallic connection exclusively to said subscriber line, wherein said subscriber line has subscriber equipment connected thereto at an end distant from said central office switch, comprising:

call initiation means for establishing a communication connection from said system for determining electrical characteristics of a subscriber line to said subscriber equipment connected to said subscriber line;

means, responsive to a subscriber located at said subscriber line applying tone signals to said communication connection, for receiving electrical signals comprising said tone signals transmitted on said communication connection to said system for determining electrical characteristics of a subscriber line; and subscriber line measuring means for determining electrical characteristics of said subscriber line via said communication connection and in response to receipt of said electrical signals comprising subscriber generated tone signals applied to said communication connection by said subscriber.

16. The system for determining electrical characteristics of a subscriber line of claim 15 wherein said subscriber line measuring means comprises:

signal processor means for comparing a representation of said subscriber generated tone signals with said received electrical signals.

17. The system for determining electrical characteristics of a subscriber line of claim 16 wherein said subscriber line measuring means further comprises:

processor means, responsive to said signal processor means, for storing data in a memory indicative of a measure of a degree of correspondence between said representation of said subscriber generated tone signals with said received electrical signals.

18. The system for determining electrical characteristics of a subscriber line of claim 16 wherein said subscriber line measuring means further comprises:

processor means, responsive to said signal processor means, for storing data in a memory indicative of at least one of a plurality of transmission characteristics of said subscriber line, including: loop length, loop capacitance, the presence of load coils, frequency response characteristics of the loop.

* * * * *